(No Model.)
S. TROTT.
ELECTRIC RAILWAY.
No. 440,906. Patented Nov. 18, 1890.
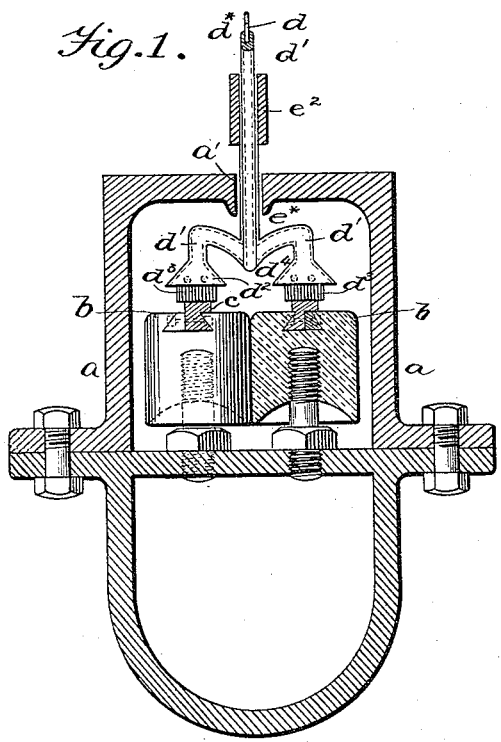
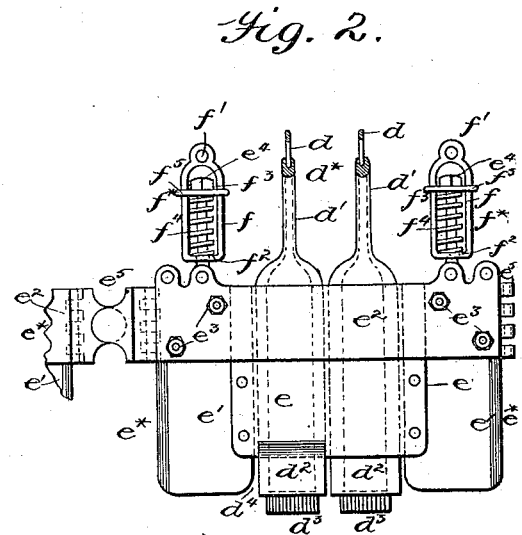
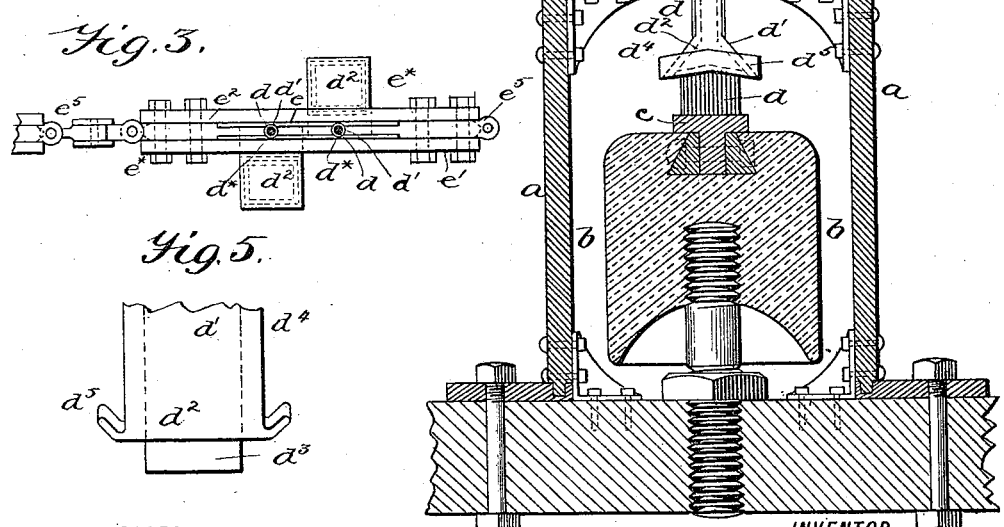
WITNESSES:
INVENTOR
Samuel Trott,
BY
ATTORNEY.

UNITED STATES PATENT OFFICE.

SAMUEL TROTT, OF HALIFAX, CANADA.

ELECTRIC RAILWAY.

SPECIFICATION forming part of Letters Patent No. 440,906, dated November 18, 1890.

Application filed April 26, 1890. Serial No. 349,635. (No model.)

*To all whom it may concern:*

Be it known that I, SAMUEL TROTT, a subject of the Queen of Great Britain, residing in Halifax, Canada, have invented certain new and useful Improvements in Electric Railways, of which the following is a specification.

The invention relates to improvements in or connected with the brush-contacts of electric railways, and has for its object to more effectually insulate the conductors connected with the contact-brushes to protect them from injury by abrasion, to protect them from falling moisture, and to provide an efficient carrier for the conductors and contact-brushes. For this purpose I incase each of the conductors in insulating material, and at the point where the brush is attached to its holder I cause the insulating material to spread out into the form of a hood, in order to protect the brush from falling moisture, the brush being arranged vertically to make contact with the upper surface of the conducting-rail. The two insulated conductors I inclose within a carrier which travels in the opening or slot of the conduit, and I thus protect them from injury by contact with the conduit or any obstruction or foreign matter which may have collected in such opening or slot. The carrier is formed with two comparatively thin plates which clamp the insulated conductors between them, such plates receiving between them at each end thereof and being screwed to a thick vertical plate which acts as a plow or clearer, and these several plates are securely connected together by means of two solid horizontal plates disposed at each side of the upper part of the carrier and firmly connected by means of bolts passing therethrough and through the end plates. The carrier is supported from the car by means of a spring device at each end thereof consisting of a frame or box flexibly connected by its upper end with the car and provided at its lower end with a hole or opening to receive a spindle rising vertically from the carrier and formed at its upper end with a screw-thread to receive a nut which acts to compress a spring coiled around the spindle within the frame or box and taking an abutment against the bottom thereof, a suitable cross-head or follower being interposed between the nut and the spring to steady and guide the upper part of the spindle. This device constitutes an elastic connection between the car and the carrier and enables the brushes to be readily adjusted in relation to the conducting-rails.

In order to obviate the difficulty of maintaining the contact of the brushes with the conducting-rails at crossings, I employ two or more carriers and corresponding parts, and I connect such carriers at their heads by flexible joints, in order to enable them to readily follow the undulations and curvature of the conducting-rails.

I sometimes form those sides of the hood which cross the conducting-rail with lipped edges, gutters, or deflectors, by which means the falling moisture will be deposited upon each side of and clear of the conducting-rail.

In order that the said invention may be more clearly understood and readily carried into effect, I will proceed, aided by the accompanying drawings, to more clearly describe the same.

Figure 1 is a transverse section of the conduit of an electric railway provided with two conducting-rails and having applied thereto two contact-brushes and connected parts constructed and arranged according to the invention. Fig. 2 is a side view of the brushes and their carrier separately. Fig. 3 is a plan thereof. Fig. 4 is a transverse section illustrating the application of the invention to a single-rail elevated railway or other similar structure; and Fig. 5 is a side view of the protecting-hood for the contact-brush, the edges of the hood being shown lipped.

Similar reference-letters indicate corresponding parts in the several figures.

$a$ represents the conduit of an electric railway. $b$ represents the insulators for supporting the conducting-rails, and $c$ represents the conducting-rails, all of which parts form the subject of prior Letters Patent granted me January 8, 1889, No. 395,761.

According to the present invention each of the conducting-wires $d$ of the conductors $d^*$ is incased in insulating material $d'$, and at the point where the brush $d^3$ is attached to its holder $d^4$ the insulating material $d'$ is spread out into the form of a hood $d^2$, in order to protect the brush $d^3$ from falling moisture, each brush being arranged vertically beneath its hood $d^2$ to make contact with the upper surface of the corresponding rail $c$.

The two insulated conductors $d^*$ are inclosed within a carrier $e^*$, which travels in the opening or slot $a'$ of the conduit $a$, and the insulated covering $d'$ of the conducting-wires $d$ is thus protected from injury by contact with the conduit $a$ or any obstruction or foreign matter which may have collected in such opening or slot $a'$. The carrier $e^*$ is formed of two comparatively thin metal plates $e$, which clamp the insulated conductors $d^*$ between them and protect them from abrasion by contact with the conduit, and between such plates $e$ at each end thereof are placed thick vertical plates $e'$, which act as plows or clearers, as is well understood, and these several plates $e$ $e'$ are securely connected together by means of two solid horizontal plates $e^2$, disposed one at each side of the upper part of the carrier $e$ and firmly connected together by means of bolts $e^3$ passing therethrough and through the end plates $e'$.

The carrier $e^*$ is supported from the car by means of a spring device $f^*$ at each end thereof, and consists of a frame or box $f$, flexibly connected at its upper end with the car by means of an eye $f'$, and provided at its lower end with a hole or opening $f^2$ to receive a spindle $e^4$, rising vertically from the carrier $e^*$ and formed at its upper end with a screw-thread to receive a nut $f^3$, which acts to compress a spring $f^4$ within the frame or box $f$ and takes an abutment against the bottom thereof, a suitable cross-head or follower $f^5$, guided by the frame $f$ and formed with a hole for the spindle $e^4$ to pass through, being interposed between the nut $f^3$ and the spring $f^4$ to steady and guide the spindle $e^4$.

The device $f^*$ constitutes an elastic connection between the car and the carrier $e^*$ and enables the brushes $d^3$ to be readily adjusted in relation to the conducting-rails $c$.

In order to obviate the difficulty hitherto experienced in maintaining the contact of the brushes $d^3$ with the conducting-rails $c$ at crossings, two or more carriers $e^*$ and corresponding parts are employed, and such carriers $e^*$ are connected together at their ends by means of flexible joints $e^5$, and they are thus enabled readily to follow the undulations and curvature of the conducting-rails $c$. This construction is illustrated in Fig. 2, wherein a portion only of the second carrier is shown.

When employing this invention in connection with an electric railway wherein only one conducting-rail $c$ and coacting contact-brush $d^3$ are employed, as represented in Fig. 4, the circuit is completed through the conduit in any known and convenient manner or otherwise. The contact-brush $d^3$, which will naturally travel beneath the slot or opening $a'$ of the conduit $a$ and the simple hood $d^2$, hereinbefore described, would direct falling moisture upon the conducting-rail $c$, and, when desired, in order to obviate this defect, those sides of the hood $d^2$ which are at right angles to the conducting-rail $c$ are formed with lipped edges, gutters, or deflectors $d^5$, by which means the falling moisture will be deposited upon each side of and clear of the conducting-rail $c$.

In the figure the conduit $a$ consists of a casing for the protection of the rail.

Having thus described my invention, I claim—

1. In combination with the brush-contact of an electric railway, the conducting-wire having insulating-covering, said covering being spread out over the brush in order to form a hood for its protection, substantially as herein shown and described.

2. In an electric railway, a carrier $e^*$, consisting of two thin side plates $e$, clamping the conductors $d^*$, two vertical end plates $e'$, fitting between the same, and two horizontal plates $e^2$, bolted together and to the other parts, such carrier $e^*$ being supported by the car, substantially as herein shown and described, and for the purpose stated.

3. In an electric railway, a carrier for the conductors and brushes, said carrier being adapted to travel in the opening or slot of a conduit and provided with a plurality of spring devices $f^*$, each consisting of a box or frame $f$, embracing a spindle $e^4$, rising from the carrier, said spindle being encircled by a coiled spring $f^4$ and having a cross-head $f^5$ and threaded to receive an adjusting-nut $f^3$, as set forth.

4. The combination, with a brush-contact carrier, of an insulating-hood $d^2$, having on two of its sides inclined gutters $d^5$, substantially as described.

In witness whereof I have hereunto signed my name in the presence of two subscribing witnesses.

SAMUEL TROTT.

Witnesses:
 GEO. W. GREGORY,
 ALBERT WATTS.